(No Model.)  13 Sheets—Sheet 1.

F. J. LUDINGTON.
MACHINE FOR MAKING PAPER PACKAGES FOR CHEROOTS, &c.

No. 561,332.  Patented June 2, 1896.

(No Model.)
13 Sheets—Sheet 2.

F. J. LUDINGTON.
MACHINE FOR MAKING PAPER PACKAGES FOR CHEROOTS, &c.

No. 561,332.  Patented June 2, 1896.

Witnesses
J. H. Shumway
Lillian D. Kelsey

Frank J. Ludington, Inventor
By Atty.
Earle Seymour (No Model.) 13 Sheets—Sheet 3.
F. J. LUDINGTON.
MACHINE FOR MAKING PAPER PACKAGES FOR CHEROOTS, &c.
No. 561,332. Patented June 2, 1896.
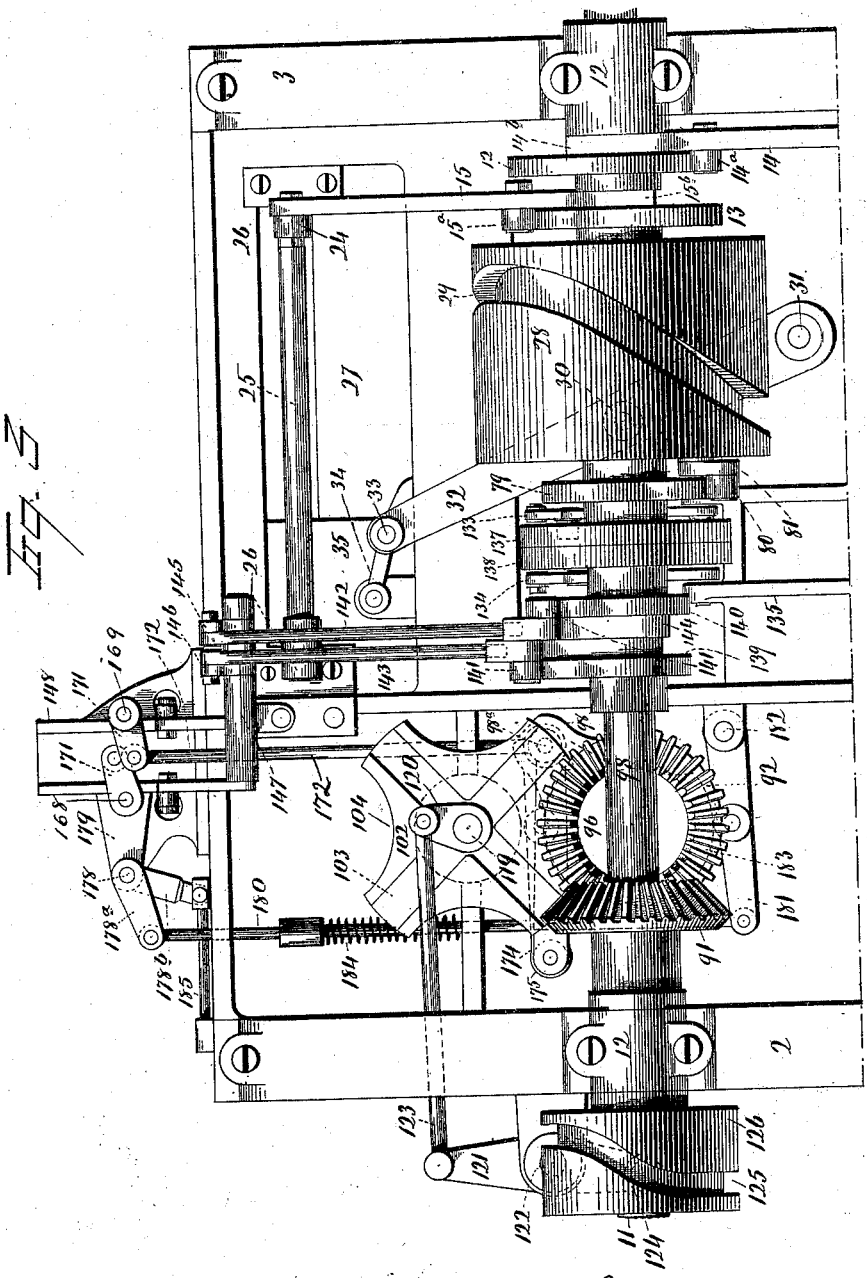

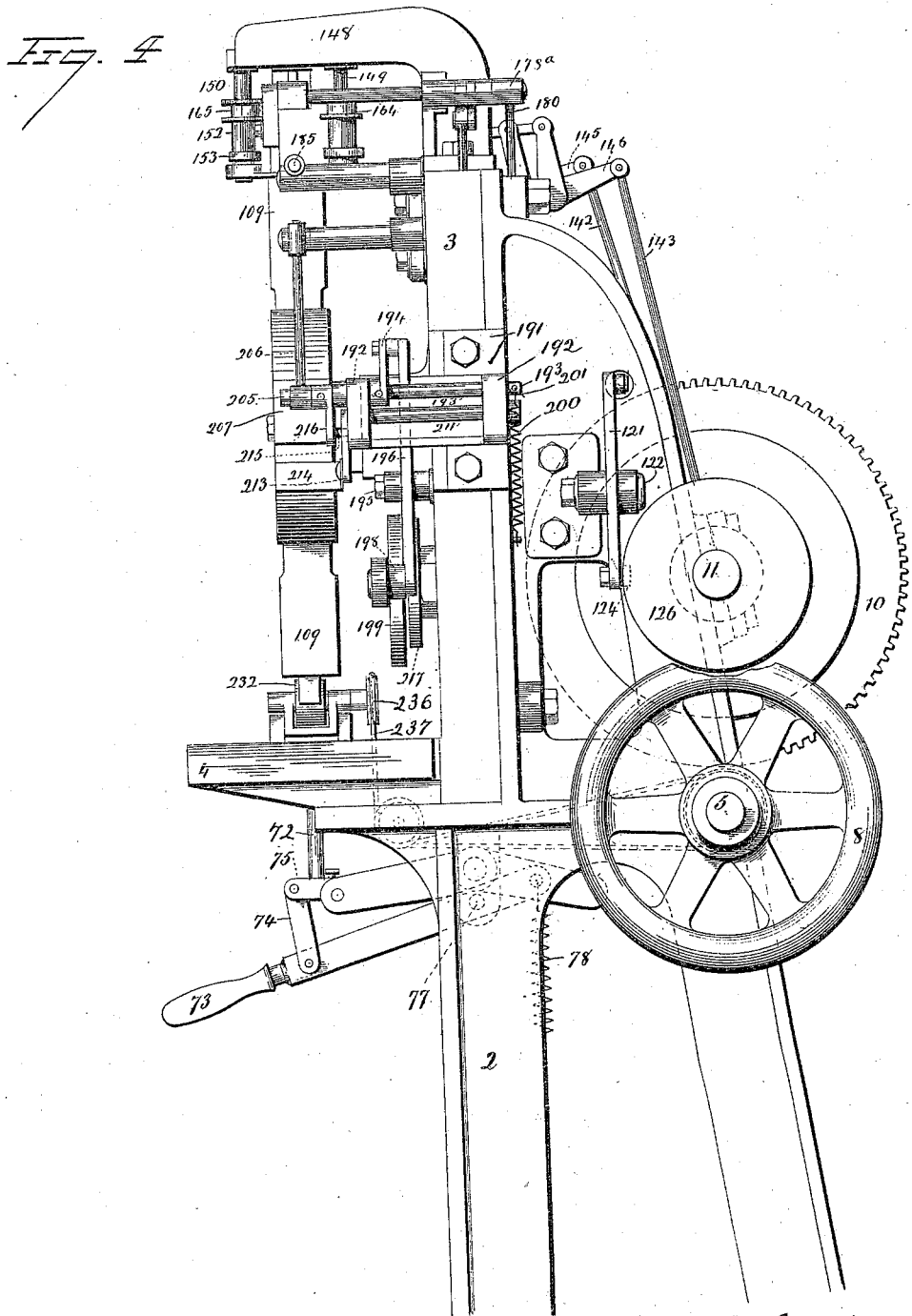

(No Model.)  F. J. LUDINGTON.  13 Sheets—Sheet 5.
MACHINE FOR MAKING PAPER PACKAGES FOR CHEROOTS, &c.
No. 561,332. Patented June 2, 1896.
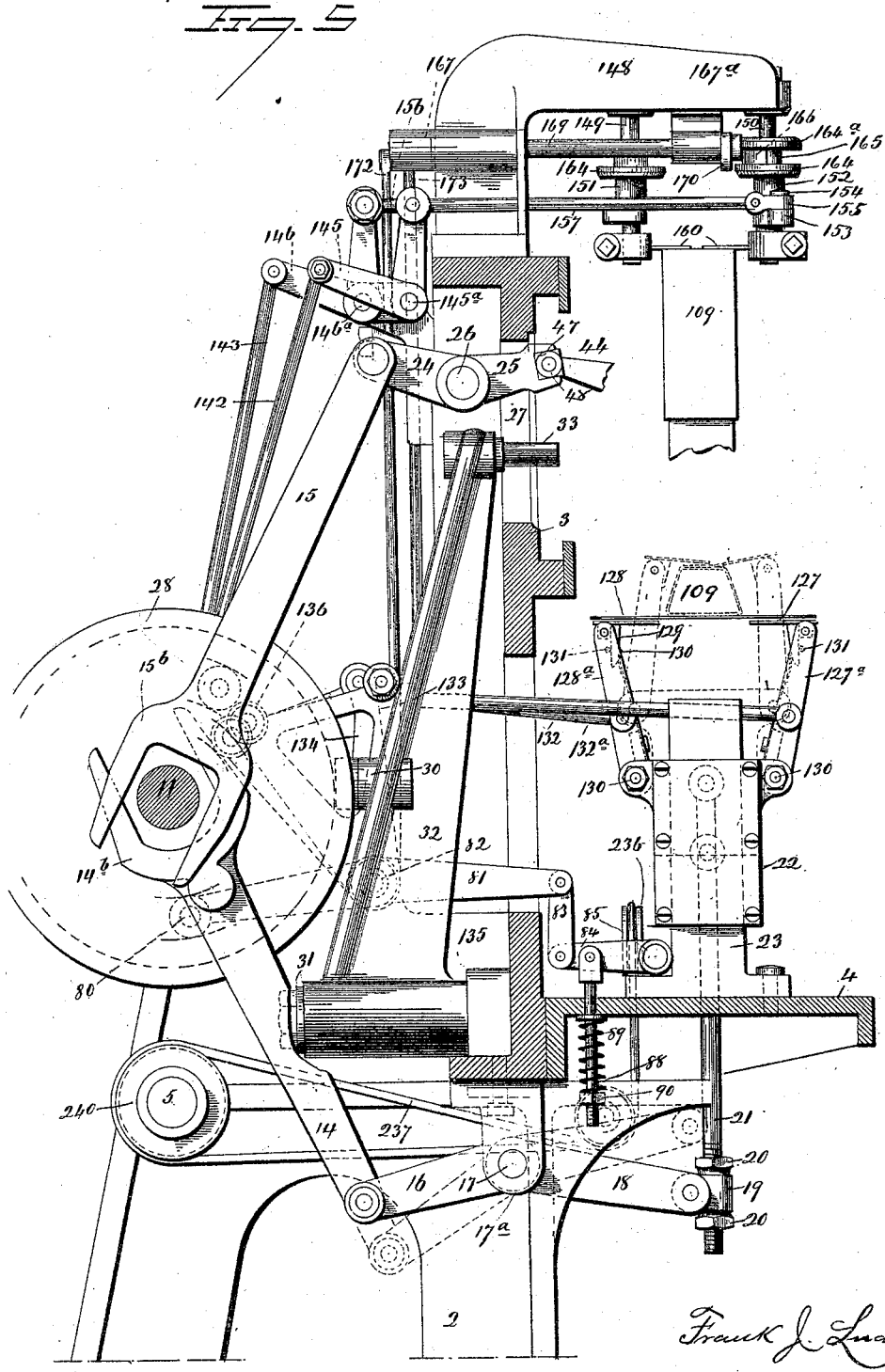

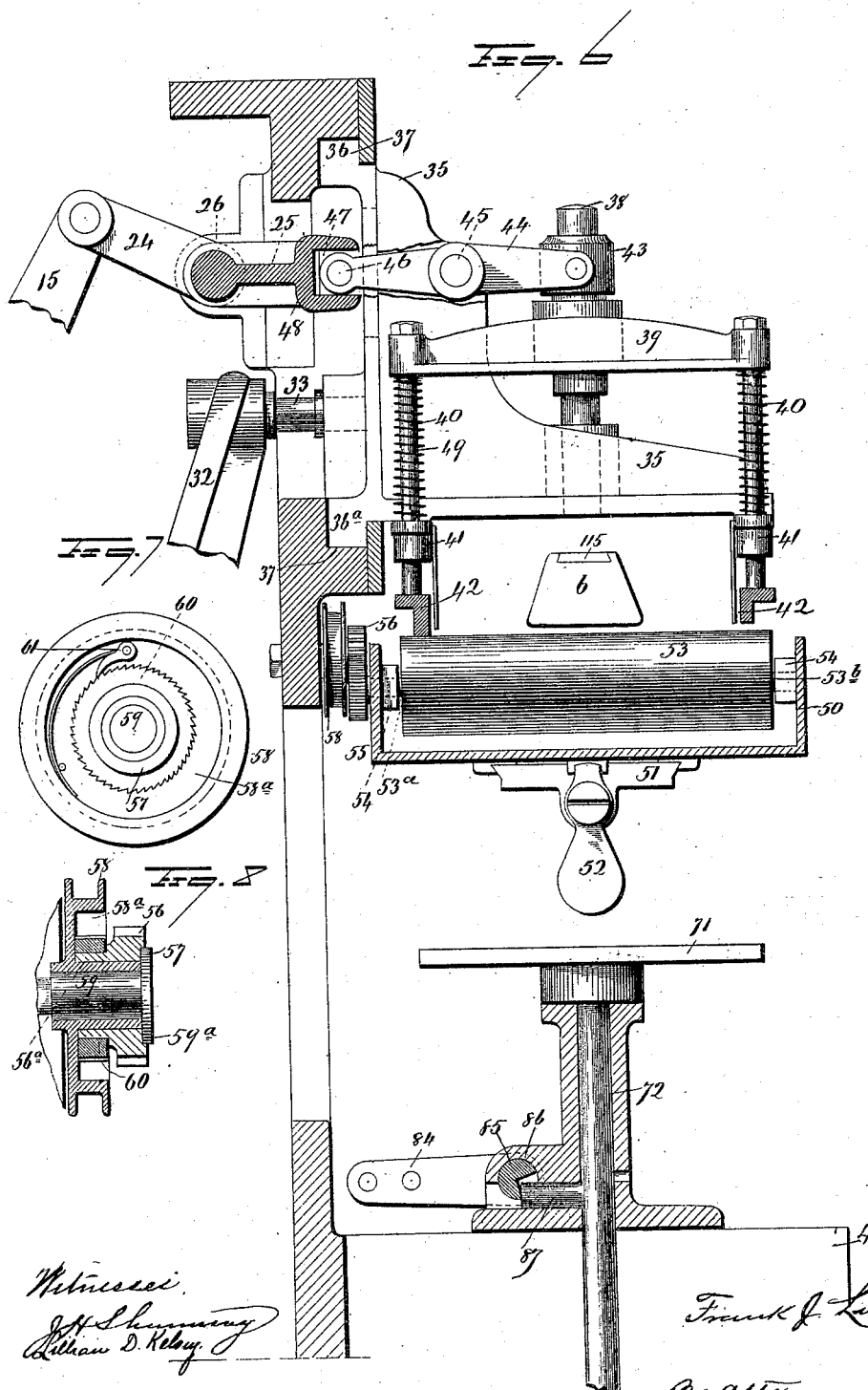

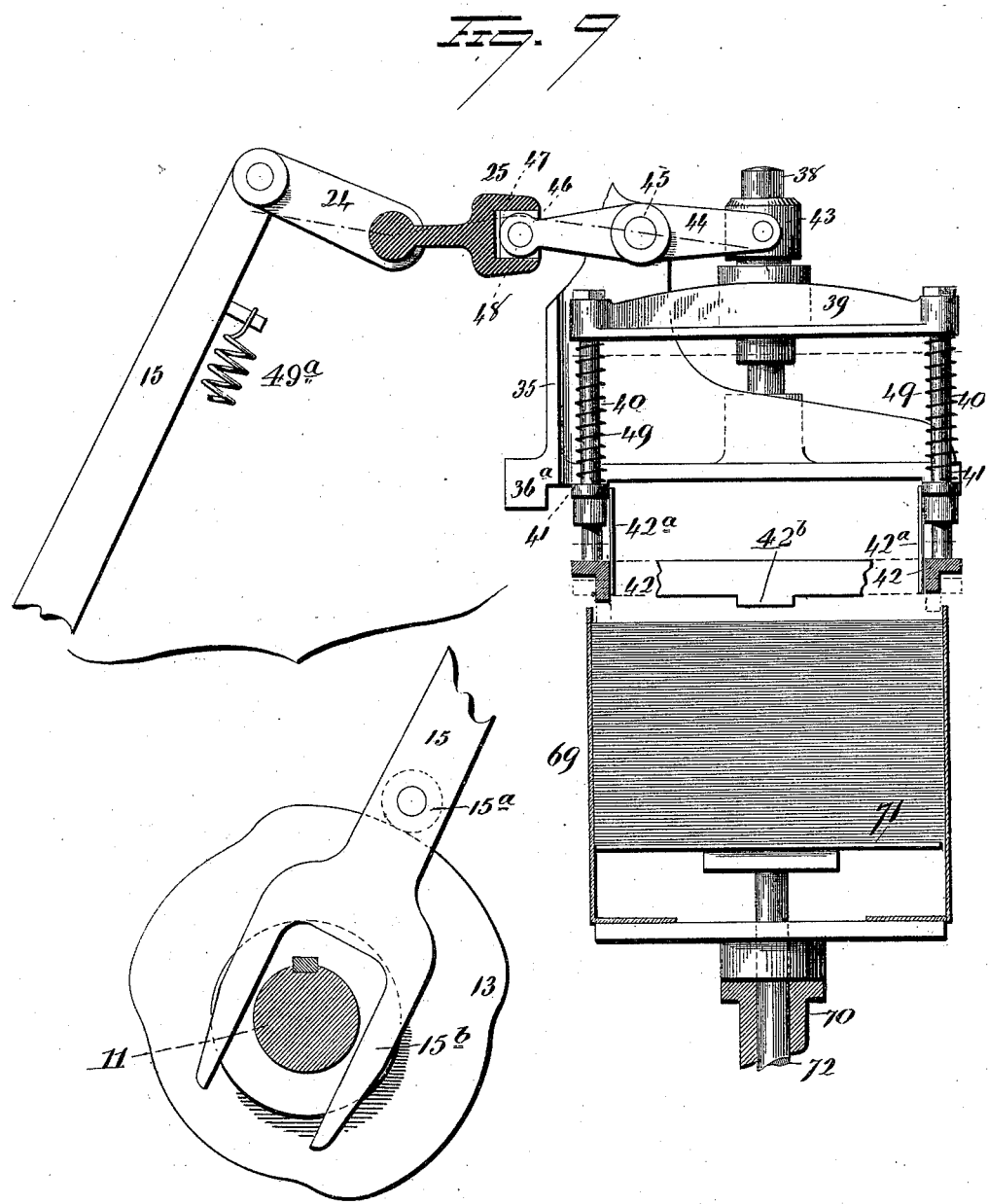

(No Model.)　　　　　　　　　　　　　13 Sheets—Sheet 8.
F. J. LUDINGTON.
MACHINE FOR MAKING PAPER PACKAGES FOR CHEROOTS, &c.
No. 561,332.　　　　　　　　　　Patented June 2, 1896.
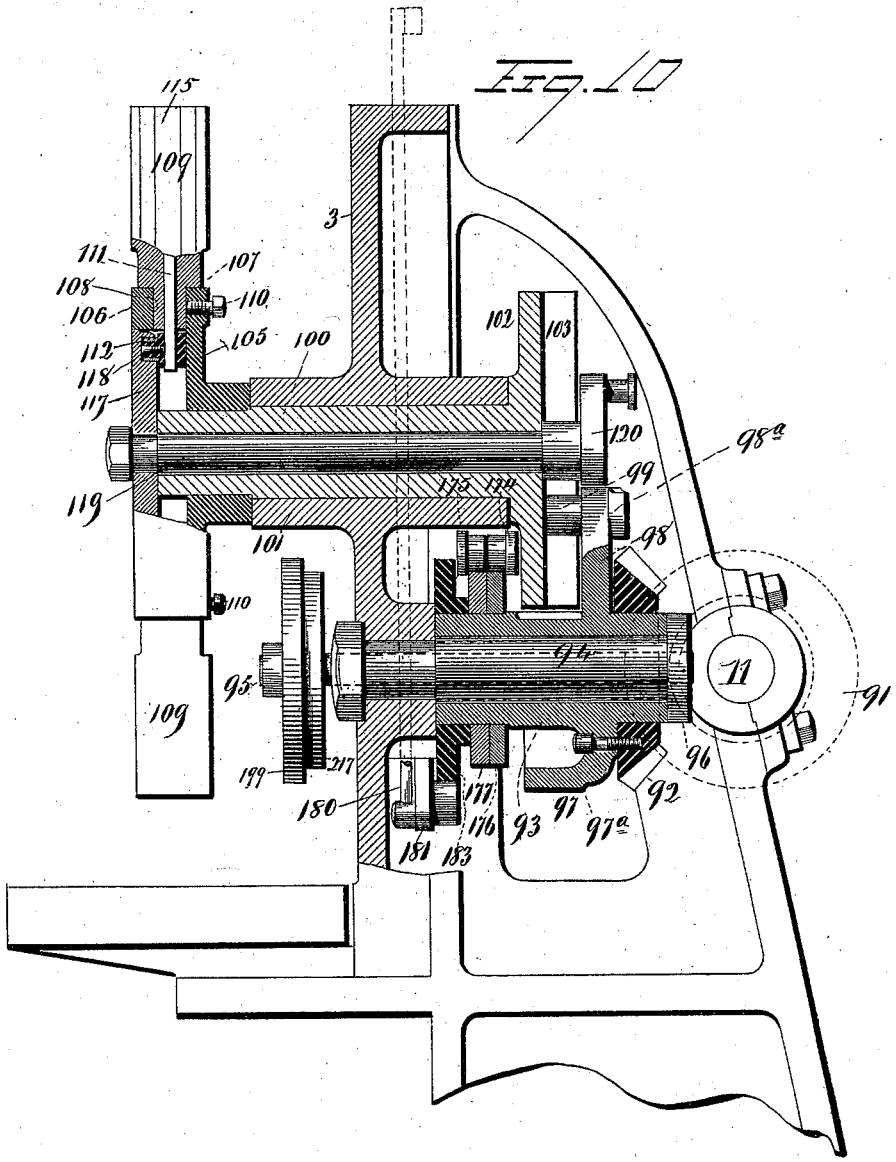

(No Model.)  13 Sheets—Sheet 9.
F. J. LUDINGTON.
MACHINE FOR MAKING PAPER PACKAGES FOR CHEROOTS, &c.
No. 561,332.  Patented June 2, 1896.
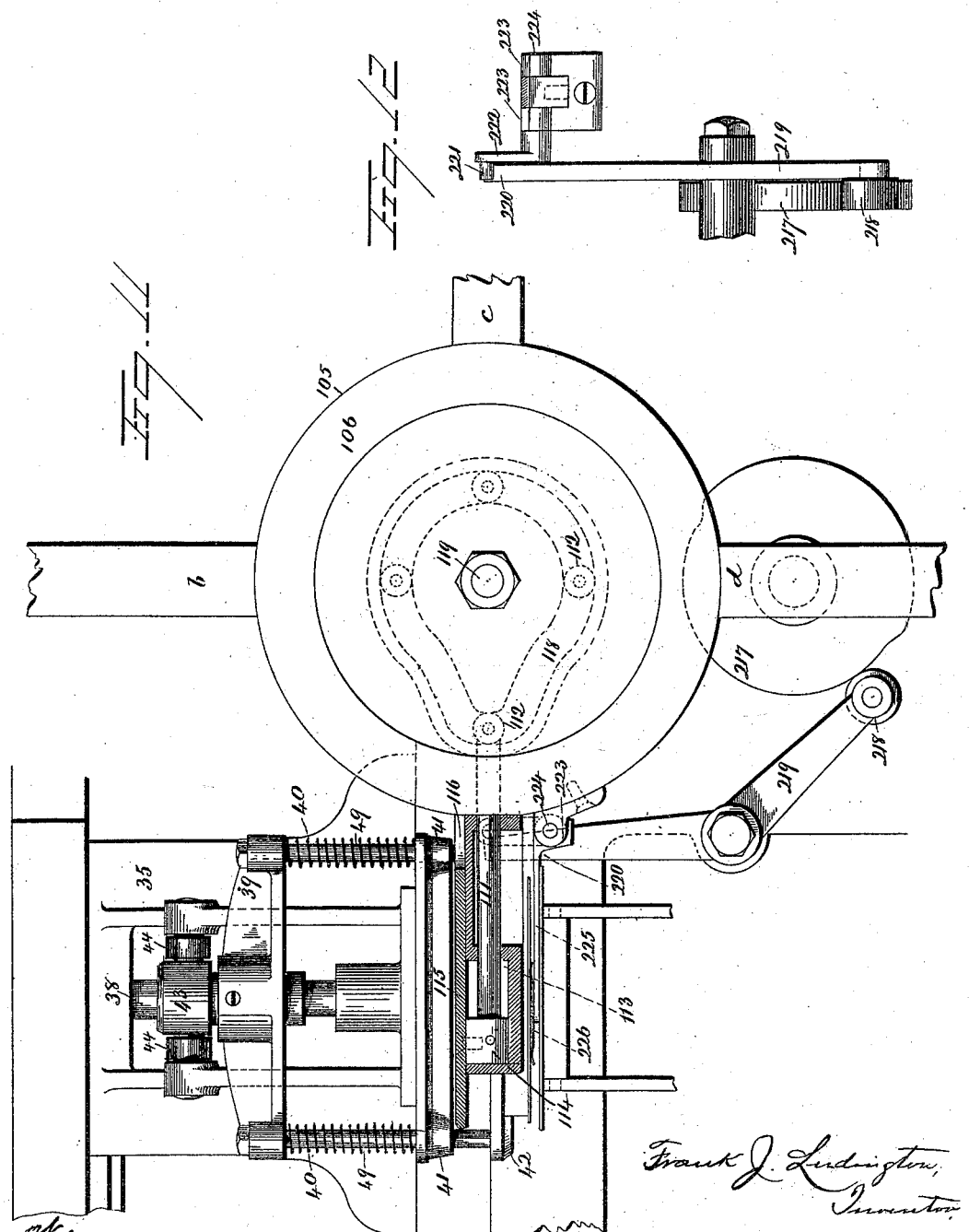

(No Model.) 13 Sheets—Sheet 10.
F. J. LUDINGTON.
MACHINE FOR MAKING PAPER PACKAGES FOR CHEROOTS, &c.
No. 561,332. Patented June 2, 1896.
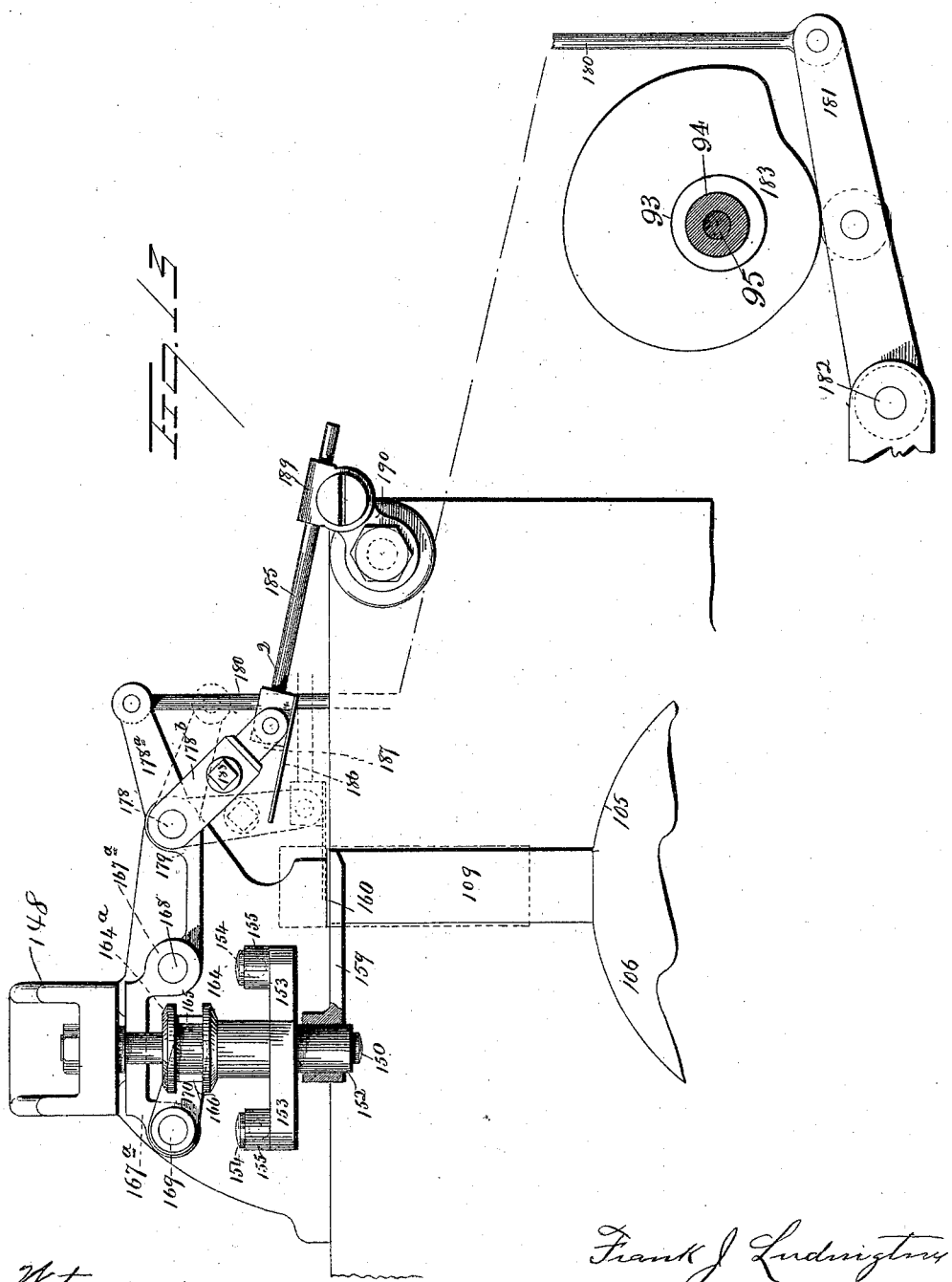

(No Model.) 13 Sheets—Sheet 11.
F. J. LUDINGTON.
MACHINE FOR MAKING PAPER PACKAGES FOR CHEROOTS, &c.
No. 561,332. Patented June 2, 1896.
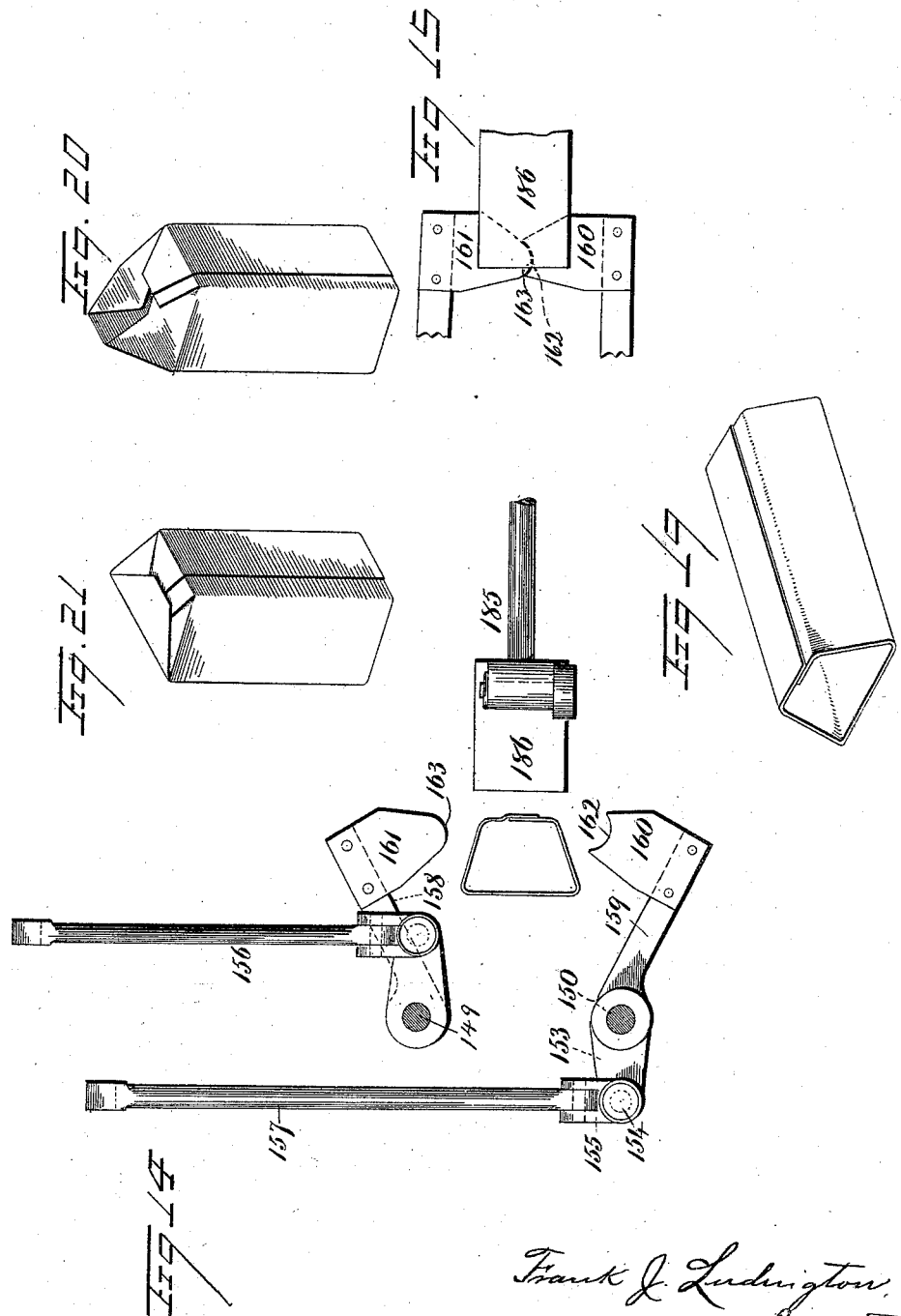
Witnesses
J. H. Shumway
Lillian D. Kelsy
Frank J. Ludington,
Inventor
By Attys.
Earle & Seymour

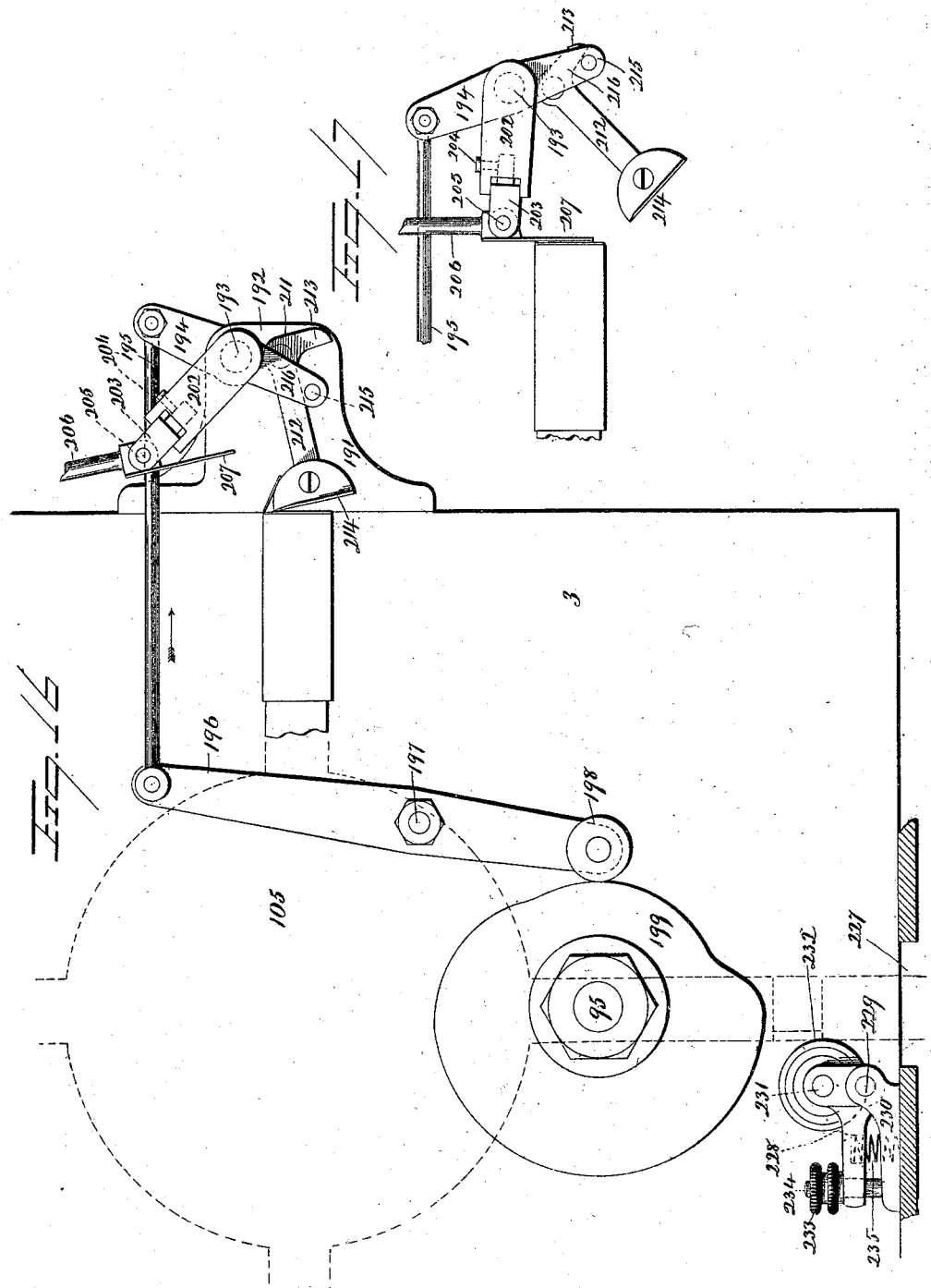

(No Model.)  13 Sheets—Sheet 13.
F. J. LUDINGTON.
MACHINE FOR MAKING PAPER PACKAGES FOR CHEROOTS, &c.
No. 561,332. Patented June 2, 1896.
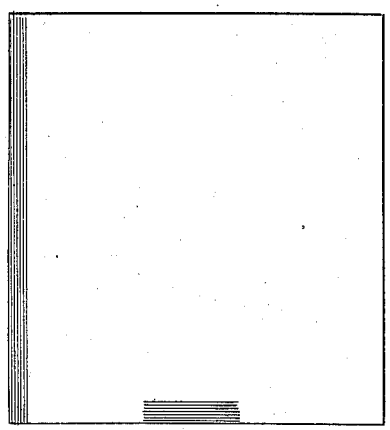
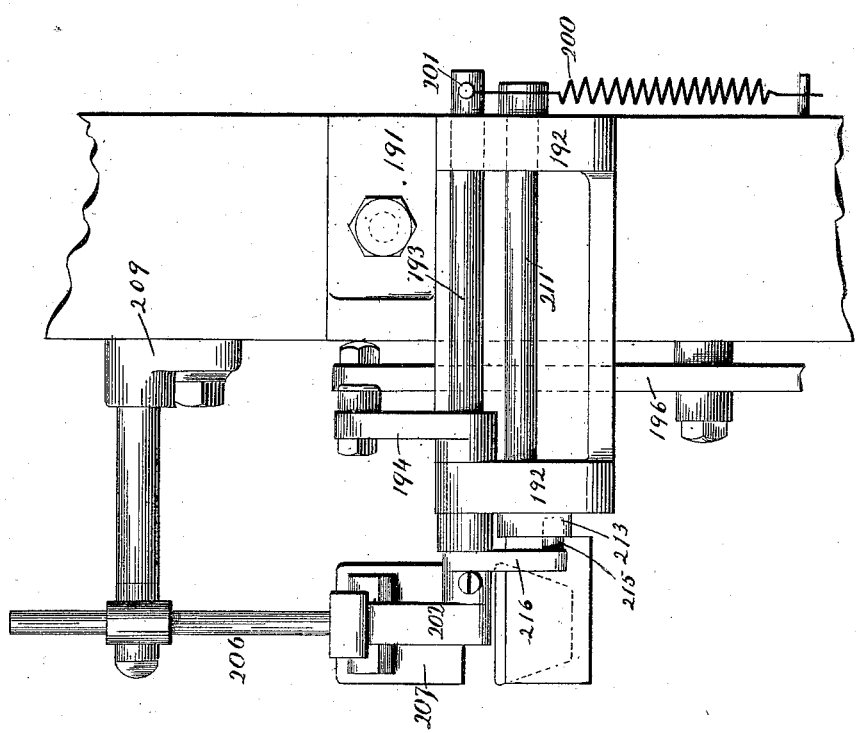
Witnesses
J. H. Shumway
Lillian D. Kelsey
Frank J. Ludington
Inventor
By Attys
Earle Seymour

UNITED STATES PATENT OFFICE.

FRANK J. LUDINGTON, OF WATERBURY, CONNECTICUT.

MACHINE FOR MAKING PAPER PACKAGES FOR CHEROOTS, &c.

SPECIFICATION forming part of Letters Patent No. 561,332, dated June 2, 1896.

Application filed October 2, 1893. Serial No. 486,980. (No model.)

*To all whom it may concern:*

Be it known that I, FRANK J. LUDINGTON, of Waterbury, in the county of New Haven and State of Connecticut, have invented a new Improvement in Machines for Making Paper Packages for Cheroots, &c.; and I do hereby declare the following, when taken in connection with accompanying drawings and the letters and figures of reference marked thereon, to be a full, clear, and exact description of the same, and which said drawings constitute part of this specification, and represent, in—

Figure 1:
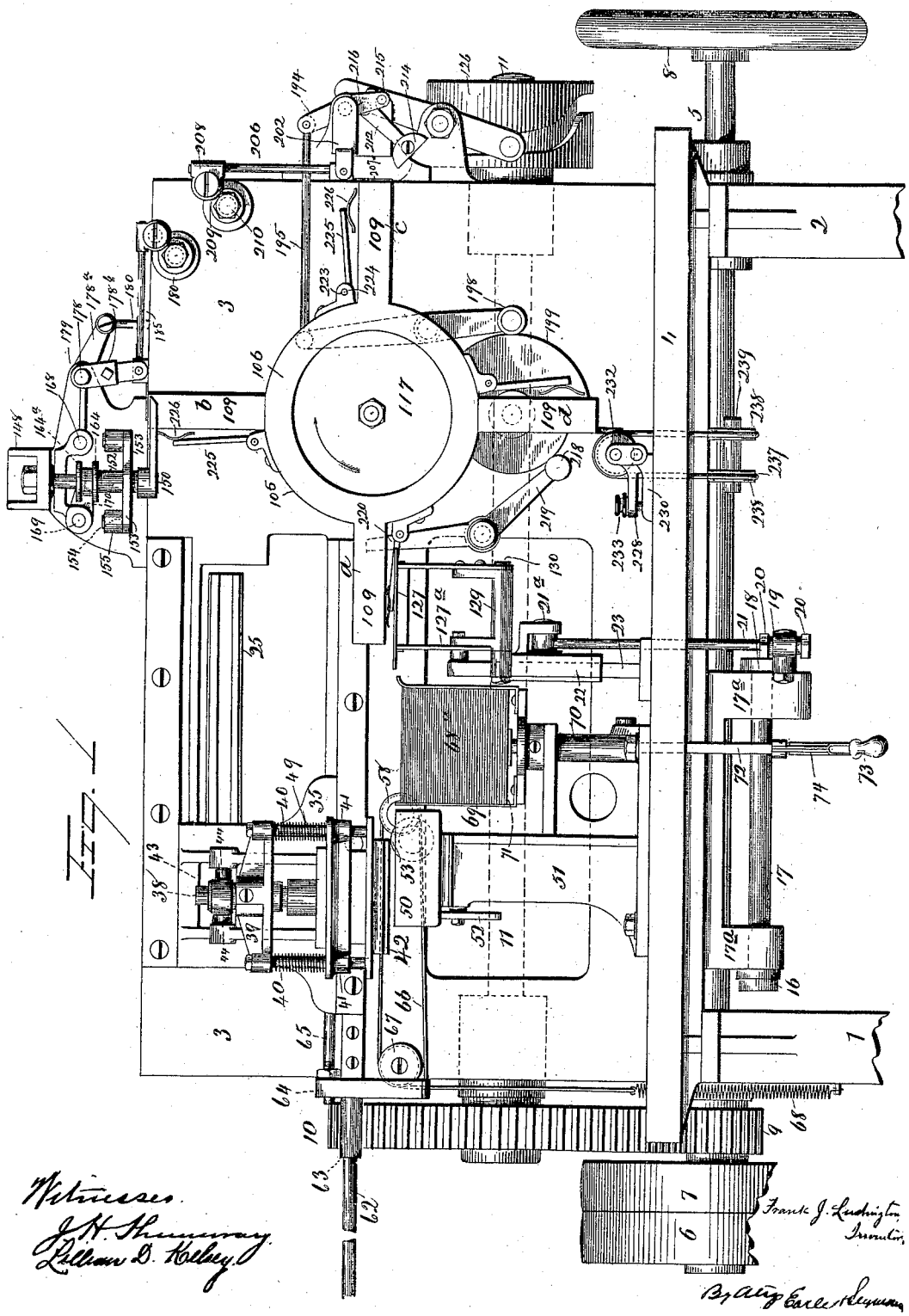
Figure 2:
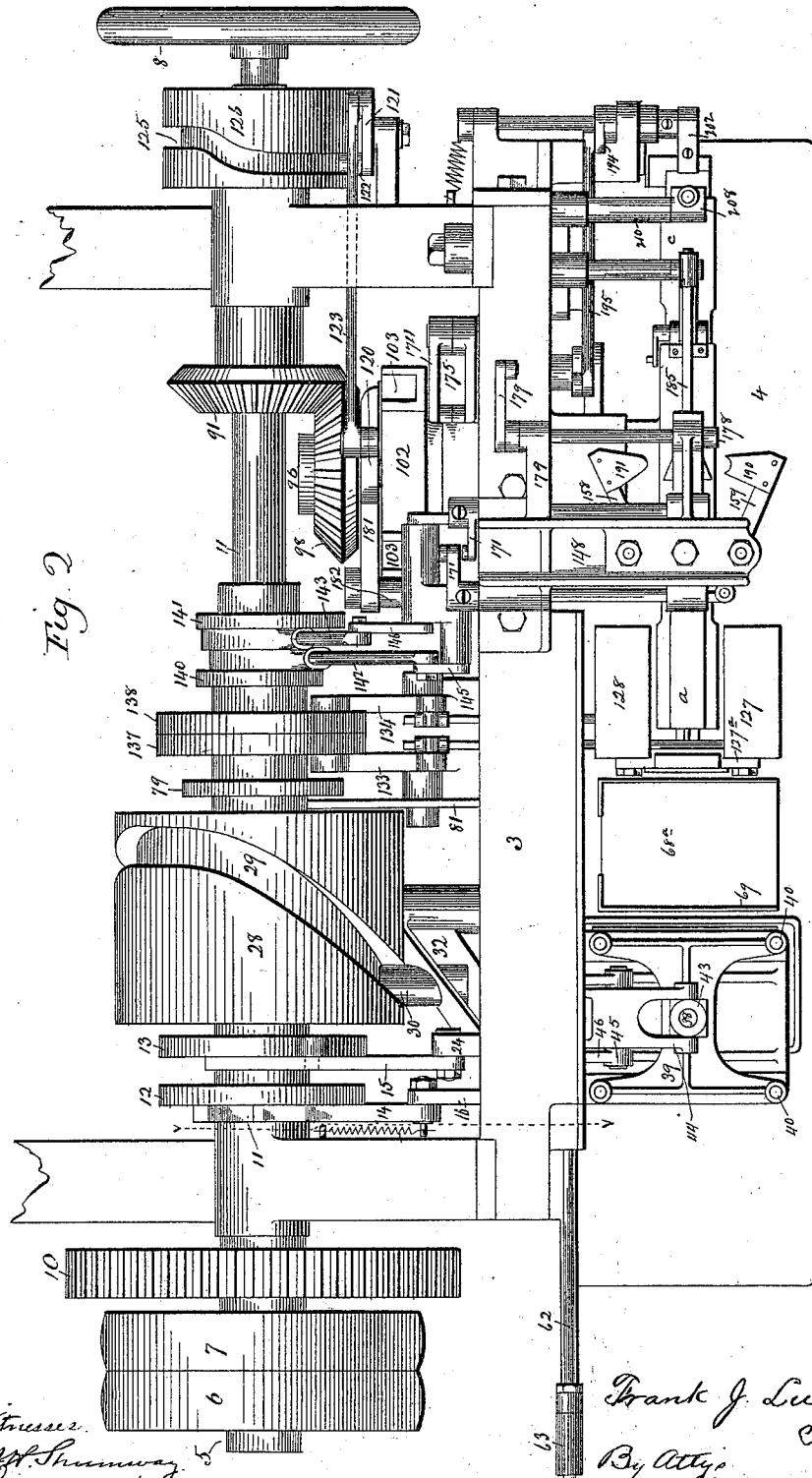

Figure 1, a front elevation of the machine; Fig. 2, a plan; Fig. 3, a rear elevation, the bracket 191 at the right of the machine and the parts supported thereby being left off for the sake of clearness but fully shown in Fig. 1; Fig. 4, an end elevation; Fig. 5, a vertical transverse section on line $v$ $v$ of Fig. 2, showing the first set of folders—i. e., the seam-folders; Fig. 6, a vertical transverse section through the pick-up or paper-carriage, gummer, and connections, showing also the friction-lock of the paper-follower; Figs. 7 and 8, detail views of the pawl-and-ratchet device for operating the gum-cylinder or paste-roll; Fig. 9, a detail vertical section through the hopper and paper-carriage, showing also the operating lever and cam; Fig. 10, a detail vertical section showing the former-head of disk and the mechanism for operating it; Fig. 11, a detail view showing the former-head and paper-carriage in elevation and one of the formers in section; Fig. 12, a detail view of the clamp for holding the blanks to the former and of the operating devices thereof; Fig. 13, a front elevation showing the second set of folders or first end-folders and their operating devices in connection with one of the formers; Figs. 14 and 15, detail views of the first end-folders, showing, respectively, their position before and after folding; Fig. 16, a front elevation, partly in section, showing the third set or finishing-folders and operating devices in connection with the formers and head and also showing the stripper; Fig. 17, a detail view of the finishing-folders, showing them in a different position from that shown in the last figure; Fig. 18, another detail of the finishing-folders, viewed from the right-hand or off end of the machine; Figs. 19, 20, and 21, views showing the respective formations of the package during its progress through the machine; Fig. 22, a plan view of a blank after it has been gummed.

This invention relates to a machine for making paper packages, especially such packages or wrappers as are intended for holding cheroots or cigarettes.

Heretofore cheroot-packages in the shape of cups have been made by hand on blocks or formers, and it is frequently a great inconvenience and loss to manufacturers of cheroots not to be able to obtain the services of skilled package-makers, and as it takes about ten days to master the work a supply for that length of time is generally kept on hand to meet emergencies. Knowing the facts I was led to devise a machine which would overcome such difficulties, and which at the same time would perform the operations and complete the package mechanically in the same way as if done by hand.

With these ends in view my invention consists in a machine having certain details of construction and combinations of parts, as will be hereinafter described, and pointed out in the claims.

Referring to the drawings, it will be observed that the lower parts of the frame of the machine are not shown. The ends 1 2, which afford bearing for several shafts, are sufficiently shown, and the front plate 3 and table 4 are fully shown. The pulley-shaft 5 carries fast and loose pulleys 6 7, respectively, and is provided with a hand-wheel 8, whereby the machine may be turned by hand when desired. A small gear-wheel 9 on shaft 5 intermeshes with a large gear-wheel 10 on drive-shaft 11, which is mounted in suitable bearings 12 above shaft 5. On this shaft 11 are mounted most of the cams for operating the machine. Referring to Figs. 1, 2, 3, and 5, $12^a$ and 13 indicate a pair of cams which act upon reciprocating bars 14 and 15, respectively, through the medium of their anti-friction-rollers $14^a$ $15^a$. The cam-bar 14 extends downwardly and the cam-bar 15 extends upwardly, and both have forked or bifurcated ends $14^b$ $15^b$, respectively, which straddle the drive-shaft 11 and retain them in position. The downwardly-extending reciprocating bar 14 is pivoted at its lower end to the arm 16 of a rock-shaft 17, which is journaled in bearings 17ᵃ underneath the table 4. The rock-shaft 17 also has an arm 18, which is pivotally connected with a collar 19, confined by means of nuts 20 on the lower end of a reciprocating rod 21. The nuts 20, whether screwed in or out, regulate the stroke of the rod 21. This rod 21 is pivotally connected at 21ᵃ to a slide 22, which is guided in its movements by a post or pillar 23. The function of the slide 22 will be elucidated hereinafter.

The upwardly-extending reciprocatory cam-bar 15 is pivoted at the top to the arm 24, projecting rearwardly from the rocking guide 25, whose trunnions have suitable bearing at 26. This rocking guide 25 projects through an opening or slot 27 in the face-plate 3, and has a function to be hereinafter stated. A cam 28 on shaft 11 is adjacent to cams 12 and 13, and is provided with a cam-groove 29, which receives the antifriction-roller 30, located above the pivot 31 of an oscillating lever 32. This oscillating lever 32 is provided at its upper end with a pin 33, which projects forwardly through the longitudinal slot 27 and pivotally connects said lever by means of a short link 34 with the paper-carriage. The paper-carriage is composed of an open frame 35, (see Figs. 1, 6, 9, and 11,) and is provided with upper and lower runners 36 36ᵃ, fitting in parallel guideways 37, whereby the carriage is guided in its to and fro movements, which are caused by the action of cam 28 on the lever 32.

The function of the rocking guide 25 may now be stated to be for lifting and depressing the pick-up mechanism located on the paper-carriage, the construction of which mechanism is as follows: A guide-post 38 is located on the frame 35 and receives spider-frame 39, so that the latter may move up and down thereon. Depending from spider-frame 39 are pins 40, which are guided in their movement through perforated lugs 41 and support at their lower ends three horizontal bars 42, arranged on three sides of a hollow square, the open side of which is adjacent to the folding mechanism of the machine. Two of these bars are constructed and arranged to perform the twofold function of gumming and picking up the blanks—namely, the rear bar and the side bar, which is the bar forming the closed side of the square and located opposite the opening thereof. To adapt the bars specified to gum and pick up the blanks, the rear bar is extended down below the front bar, than which it is wider. This is shown, for instance, in Fig. 9 of the drawings, in which the rear bar is seen to be wider than the front bar. The side bar is seen in the same figure to be furnished with a centrally-located downward projection 42ᵇ, the lower edge of which lies in the same horizontal plane as the lower edge of the rear bar. The front bar has no picking-up or gumming function, but is employed to give support to the forward end of the side bar and to prevent the blanks from rising up when the side bar and rear bar come down upon them. When the said bars are constructed and arranged as described, the blanks will be gummed, as shown in Fig. 22, which represents a blank having its inner end continuously gummed and its outer edge provided midway of its length with an isolated strip of gum. When, therefore, the blanks are picked up, they are not wholly supported, but their inner edges and outer ends are left free. I shall have more to say at another time in explanation of the particular mode shown of gumming the blanks. The frame 39 is depressed by means of a collar 43, loosely mounted on guide-post 38 above the spider-frame 39, which collar is pivoted at the forward end of a short lever 44, pivoted at 45 to the carriage-frame 35. The rear end of the lever 44 is pivoted at 46 to a sliding block 47, which is received in a longitudinal way 48 in the face of the rocking guide 25. It is evident from this that when the carriage is moved the block 47 slides in guideway 48; but such construction at the same time permits the lever 44 to operate to depress the pick-up. Springs 49, coiled around the pins 40, elevate the pick-up, and a spring 49ᵃ, (see Fig. 9,) connected at its upper end with the lever 15 and at its lower end with a stationary point in the machine-frame, is employed to cause the roller 15ᵃ to rest on the face of the cam 13, which acts against the tension of the said spring 49ᵃ in lifting the lever 15, which raises the collar 43 and permits the springs 49 to raise the frame 39, and hence lift the bars 42, as shown in Fig. 9.

I do not limit myself to locating and arranging the spring 49ᵃ as shown and described, for any construction and arrangement of it that will cause it to constantly draw the lever 15 downward and hold its roller 15ᵃ upon the cam 13 will answer the purpose.

The paste or gum tray 50 (shown in Figs. 1, 2, and 6) is dovetailed onto the top of a support 51, rising from table 4, and is confined thereon by means of a pivoted button or catch 52, located on the support. Within this tray 50 a paste roll or cylinder 53 rotates, said tray having bearings 54 to receive the journals 53ᵃ 53ᵇ. Journal 53ᵃ projects through one side of the tray 50 and carries a gear-wheel 55, which intermeshes with a gear-wheel 56, that turns on the perforated boss 57 of the grooved pulley 58. (See Figs. 6, 7, and 8.) Pulley 58 turns on a pin 59, projecting from face-plate 3 underneath guideway 37. Said pulley is dished or hollowed out, and in its annular recess 58ᵃ turns a ratchet-wheel 60, which is fast on perforated boss 56ᵃ of gear-wheel 56. Adapted to engage the teeth of the ratchet-wheel 60 is a spring-actuated pawl 61, pivoted in recess 58ᵃ. A head 59ᵃ on the pin 59 retains the parts located thereon in position. Projecting outwardly from the left-hand end of the machine is a guide-bar 62, on which a tubular slide 63 is adapted to move. At the top of the T-head 64 of said slide is secured an adjustable contact-rod 65, against which the paper-carriage is adapted to impinge to move slide 63 on guide-bar 62. A cord 66 is secured to the lower end of T-head 64 and is passed several times around grooved pulley 58. It then returns and passes over grooved idle-pulley 67, and thence it passes down and is secured at its lower end to a tension-spring 68 on frame end 1. This pulley mechanism and connected parts constitute what may be termed a "speed-regulator" for the paste-roll 53, as it is caused to move at the same speed as the paper-carriage. Its operation will be described hereinafter.

The above-described speed-regulator has been found to be the preferable device for accomplishing the simultaneous or synchronous movement of the paste-roll with the paper-carriage; but it is evident that other and perhaps more satisfactory means for attaining that end are within the province of mechanical skill, and I do not therefore limit myself to that special construction.

The hopper 69, wherein the paper blanks 68$^a$ are placed to the number of about one thousand, is located on tubular support 70. It is in juxtaposition to the gummer, and for the purpose of always bringing a blank to the top to be gummed it is provided with a follower composed of a plate 71, located therein, and a rod 72, which moves in the hollow support 70. (See Figs. 1, 2, 4, 6, and 9.) The lower end of the rod 72 is secured to a hand-lever 73 by means of a link 74 and a block 75, to which the link is pivoted. The lever 73 is fulcrumed at 77 underneath the face-plate 3, and its rear end is secured to a spring 78. The tendency of spring 78 is to throw the follower upwardly, and thus press upon the blanks in the hopper 69 to bring the top blank always at the top of the hopper. A cam 79, located on the shaft 11 adjacent to the cam 28, engages an antifriction-roller 80 on one end of a lever 81, fulcrumed at 82. The forward end of the lever 81 is connected, by means of an adjustable link 83, with a short rock-arm 84, located on the rock-shaft 85. Rock-shaft 85 is notched at 86, and this notch receives a friction-pin 87, resting against the follower-rod 72. A spring-depressed bolt 88 passes through the table 4 and is pivoted at its upper end to the rock-arm 84. 89 is the spring on said bolt 88, and 90 is a nut screwed onto the bolt for regulating the tension of the spring. The adjustment of said spring regulates the friction required on the follower-rod 72 and at the same time holds the antifriction-roller 80 in contact with the face of the cam 79. It will be observed that one wall of the notch 86 is normally in contact with the rear end of the pin 87. This frictional contact tends to hold the follower from being constantly acted upon by the spring 78.

The utility of the friction-lock, described as composed of rock-shaft 85 and pin 87, will be further referred to hereinafter.

In Figs. 3 and 10 I have shown what is termed the "star" movement, which acts upon the former head or disk and causes it to revolve intermittently at the proper time. This construction will now be described.

91 is a bevel gear-wheel on the shaft 11, which intermeshes with bevel gear-wheel 92, located on a sleeve 93, which turns on a stud 94, extending rearwardly from the face-plate 3. This stud 94 is tubular and provides bearing for a shaft 95, which projects from the rear through the face-plate, and which is secured by means of suitable screws to the sleeve 93, through the medium of a collar 96, fitted on the shaft 95. Formed with the sleeve 93 is a notched wheel 97, located just behind the beveled wheel 92 and provided with a lug 98, carrying an antifriction-roller 99 on a pin 98$^a$. The lug 98 is contiguous to and located to the rear of the notch of the wheel 97. Above the shaft 95 is a tubular shaft 100, journaled in a bearing 101 of the face-plate 3 and provided at its rear end with a head 102. The rear face of this head is crossed by radial ways 103, communicating at the center of the head. Between the contiguous ways the periphery of the head 102 has semicircular cut-aways 104. This head is acted upon by the roller 99, projecting from the lug 98, which roller travels in the radial ways or grooves 103. The operation of this star movement will be elucidated hereinafter, but I will here state that I lay no broad claim to its construction.

Referring now to Figs. 1, 2, 4, 10, and 11, 105 indicates the former-disk, which is secured on the tubular shaft 100 of the machine. This disk 105 has an annular rim 106, provided with radial openings 107, in which the reduced ends 108 of the former-blocks 109 are fitted. They are secured in the former-disk 105 by means of set-screws 110, that engage said reduced ends. The cross-section of these formers is similar to that of the cheroot-packages to be formed thereon—that is to say, such section is trapezoidal. These formers 109 radiate from the disk 105 and are in the present machine four in number. They are bored longitudinally clear through the reduced portions 108 to receive sliding rods 111, which at their inner ends are provided with antifriction-rollers 112. In longitudinal recess 113 of each former projects a lug 114 of a longitudinally-movable slide or plate 115, received by a longitudinal groove 116 in the narrowest surface of the former. The face of the said slide 115 is flush with said narrow surface. The outer ends of the sliding rods 111 are secured in said lugs 114, so that when the rods are moved the several slides 115 will be caused to move with them. These longitudinally-movable slides have the twofold function of assisting in supporting the blanks while the same are being initially folded and sealed and in stripping the finished packages from the formers. The movements of the said slides 115 are caused by means of an annular plate 117, fitting within the rim 106 of the disk 105. For this purpose the inner face of the plate 117 is provided with a cam-groove 118, which receives the antifriction-rollers 112. Said annular plate 117 does not rotate with the disk 105, but has an independent oscillating movement. An oscillating shaft 119 carries said plate 117 and has bearing within the tubular shaft 100, its rear end having a crank 120, whereby it is oscillated. This crank 120 (see Fig. 3) and a lever 121, fulcrumed at 122 on a lug at the right-hand end of the machine, are connected by a connecting-rod 123. The lower end of the lever 121 bears an antifriction-roller 124, which engages in cam-groove 125 of cam 126, mounted on shaft 11, so that the lever and crank 120 may be oscillated.

The reciprocating slide 22, hereinbefore referred to, carries the forwardly and inwardly movable seam-folders to and from their work, and said folders are so located that the former-disk 105 always brings the formers in succession into position over them. The seam-folders (see Figs. 1, 2, and 5) comprise a pair of parallel folder-blades 127 128 and arms 127$^a$ 128$^a$, located on sleeves 129, which oscillate on pivots 130, extending from slide 22. The arms 127$^a$ 128$^a$ are in pairs, and the blades 127 128 are pivoted to their upper ends. The blades 127 128 are provided with under projections 129$^a$, (see Fig. 2,) with which flat springs 130, secured to the arms, engage. Stop-pins 131 on the arms limit the movement of the blades, as enforced by the springs 130. Intermediate of their ends the arms 127$^a$ 128$^a$ are pivotally connected with the outer ends of reciprocating rods 132 132$^a$, whose inner ends are pivotally connected with bell-cranks 133 134, pivoted to the bracket 135 at the back of the face-plate 3. These bell-cranks 133 134 are provided with antifriction-rollers 136, which are received by the cam-grooves in the sides of the cams 137 138, located on cam-shaft 11. The operation of the folders will be described farther on.

Referring to Figs. 1 to 5, inclusive, and Figs. 10, 13, 14, and 15, I will now describe the upper folders or first end-folders and the instrumentalities whereby they are operated. Secured on cam-shaft 11, next to cams 137 138, are two cams 139 140, which engage antifriction-rollers 141 on the reciprocating bars 142 143, that project upwardly and are provided with bifurcated ends 144, by which the shaft 11 is straddled to hold the said bars in position. The upper ends of the reciprocating bars are pivoted to the lower ends of bell-cranks 145 146, which are fixed on the short shafts 145$^a$ 146$^a$, journaled in a bracket 147 on the back of the face-plate 3, one in advance of the other. A forwardly-projecting bracket-arm 148 on top of the plate 3 is provided with a pair of depending parallel spindles 149 150, located one behind the other. On these spindles 149 150 turn sleeves 151 152, provided with lateral lugs 153, having pivots 154, over which fit the collars 155. Said collars 155 are pivoted to the outer ends of the connecting-rods 156 157, and the inner ends of these rods are pivotally connected with the upper ends of the bell-cranks 145 146. The inner ends of the arms 158 159 are fixed on the lower ends of the sleeves 151 152, while their outer ends carry blades 160 161, arranged in the same plane. The blades are located directly above the former-disk 105. Blade 160 has a notch 162 at its extremity, while blade 161 has a rounded end 163, which fits in said notch, and both blades taper toward the ends. These are the side end-folder or flap-forming blades. The construction just described causes the blades to approach each other or move inwardly edgewise in the manner to be hereinafter stated, and to cause the blades to move downwardly sidewise the following construction is used: Between annular flanges 164 164$^a$, at the upper ends of the sleeves 151 152, annular grooves 165 are provided, which receive pressure-blocks 166, that are adapted to press down upon the sleeves to lower the blades, but which at the same time permit the sleeves to turn on their spindles 149 150. The bearings 167 167$^a$ on the bracket-arm 148 receive the parallel rock-shafts 168 169, whose outer ends are provided with rock-arms 170, that are pivoted at their extremities to the pressure-blocks 166 and whereby the latter are operated.

The inner or rear ends of the rock-shafts 168 169 are provided with additional rock-arms 171, located behind the bracket-arm 148, and to which are pivoted the upper ends of reciprocating rods 172 173. The lower ends of these rods are pivoted to the levers 174 175, which are located behind the star movement, and which are acted upon by the cams 176 177, located on the sleeve or hollow shaft 93.

Two of the sets of the first end-folders have been described. I will now describe the third, which folds down one of the flaps formed by said two and which moves toward them. A rock-shaft 178 is journaled in bearings 179 of the bracket-arm 148, parallel with rock-shafts 168 169, and has at each end rock-arms 178$^a$ 178$^b$, respectively. The rock-shaft is operated by means of a connecting-rod 180, pivoted to arm 178$^a$ at its upper end and to the lever 181 at its lower end. Said lever is fulcrumed at 182 and is actuated by a cam 183 on the hollow shaft 93. Spring 184, coiled around the rod 180, lifts it, and thus keeps the lever 181 in position to be operated by cam 183. A reciprocating rod 185 carries the rectangular flap-folder blade 186 at its forward end and is pivoted in an adjustable bearing 187, secured in a socket in the rock-arm 178$^b$ by means of set-screw 188. Said rod 185 is supported and guided in its movements at its rear end by means of a guide 189, pivoted to a short oscillating link 190, which in turn is pivoted to the face-plate 3.

The blade 183 moves in a path above that of the blades 160 161.

For a description of the last end-folders or flap-folders reference will now be had to Figs. 1, 2, 4, 10, 16, 17, and 18. A bracket 191 is located at the right-hand end of plate 3 and has lugs 192 providing bearings for a rock-shaft 193. This shaft 193 has a rock-arm 194, which has pivotal connection with one end of a connecting-rod 195, the other end of which is pivotally connected with the upper end of lever 196, fulcrumed at 197 to the face-plate 3. The lower end of lever 196 bears an antifriction-roller 198, which is brought in contact with the cam 199, located on shaft 95, by means of a spring 200, secured to a lateral projection 201 at the rear end of rock-shaft 193. A rock-arm 202 at the front of the rock-shaft 193 is provided with an adjustable extension 203, secured by set-screw 204 and furnishing bearing for the pivot 205 at the forward or lower end of the reciprocating rod 206. The lower end of this rod 206 carries the downwardly-projecting rectangular flap-folder blade 207, which is adapted to move both forwardly and inwardly. The reciprocating rod 206 is guided in its movements by means of a guide 208, located at its upper end and pivoted to a short swinging or oscillating link 209, pivoted at 210 to the front of the face-plate 3. Journaled in the lugs 192, below and parallel with the rock-shaft 193, is an oscillating shaft 211, provided with a rock-arm 212. This arm 212 has a projecting heel 213, and carries at its forward end the blade 214, which is moved toward and is caused to coact with blade 207 by reason of a contact-pin 215 on a lug 216, that projects laterally from the rock-shaft 193 and is adapted to engage both the arm 212 and its heel 213.

In Figs. 1, 4, 11, and 12 a cam 217 is shown mounted on shaft 95, behind the cam 199, and which bears on antifriction-roller 218 at the lower end of trip-lever 219. The upper end 220 of this lever terminates at the point where the blanks are delivered to the first or seam folders and the formers. At the proper moment this lever 219 is operated so as to cause its end 220 to come in contact with pins 221 and trip the crank-arms 222, which carry said pins. Located on the rim 106 of the former-disk are perforated lugs 223, in which the pivots 224 of the grippers turn, said grippers being composed of plates or bars 225 and curved springs 226, secured thereto, and said pivots carrying the crank-arms 222, which, when they are tripped, cause the grippers to operate and hold the blanks under the formers while the seams of the package are being made.

After the package is made it is removed from its former by a stripper, now to be described, and dropped through delivery-orifice 227 in table 4 into a suitable receptacle. (See Figs. 1, 5, and 16.) An L-shaped frame 228 is pivoted at 229 in bearings 230 on top of the table 4 in juxtaposition to orifice 227. In the forward end of this pivoted frame 228 turns a shaft 231, on which the stripping-roller 232 is mounted. The position of the roller 232 is regulated by means of nut 233, screwed into a post 234, which extends through the rear end of the frame 228. An expansion-spring 235 is located under the rear end of frame 228 and its upward pressure is controlled by said nut 233.

Around a pulley 236 on the inner end of shaft 231 passes an endless band 237, which passes under a pair of guide-pulleys 238, journaled in bearings 239 under the table 4 and around a pulley 240 on pulley-shaft 5. By means of this band 237 the roller 232 is rotated.

It will be readily understood that all levers acted on by single-acting cams must be returned to normal position by springs or their equivalent. Some of the springs have been shown and further illustration is deemed unnecessary.

The construction of the machine having been described, I will now proceed to describe the operation thereof, as well as the functions of the several parts not heretofore stated.

The machine being set in motion, cam 28 first acts on oscillating lever 32, causing the paper-carriage to move inwardly, and as it will be understood that the carriage has already moved to its outward limit it will have of course come in contact with bar 65 and through the medium of the connections have caused the spring 68 to expand and create a tension therein. Now as the paper-carriage moves inward the tension of spring 68 causes the cord 66 to operate on paste-roll 53 through the medium of the pawl 61, ratchet 60, and gearing 55 56, thus rotating the roll at the same rate of speed that the carriage travels and applying paste or gum on the under surface of the pick-up 42. As soon as the carriage reaches a position directly above the hopper 69 the conformation of its operating-cam 28 is such that it pauses, while the cam 13 operates on reciprocating bar 15 and rocks the rocking guide 25, thus lowering the pick-up 42 and bringing its gummed surface in contact with the uppermost blank in the hopper, after which it immediately picks up the blank and ascends. After the pick-up descends and while it dwells before it ascends the cam 79 operates on lever 81 to cause the friction lock 85 86 87 to be released and permit the spring 78 to act for an instant to move the follower-plate 71 upward against the pick-up. The paper-carriage is now caused to again advance after the ascent of the pick-up by reason of the conformation of its cam 28 and to place the gummed blank between one of the formers 109 and its gripper, which is in position to receive it. The gripper is now operated by its cam 217 and lever 219, when it grasps and holds the blank against the under side of the former. Before the carriage is moved back out of the way the cam 13 of the pick-up 42 elevates the latter again slightly and brings the blank thereon in contact with the parallel strips 42$^a$, projecting down from the frame of the carriage, thus causing the gummed blank to be stripped from the pick-up and left entirely free from it between the former and its gripper.

The seam to be made in the package or wrapper being longer than the height of the completed articles or cups it is necessary to furnish a support for the seam, which will come into play when it is being made, and which will retreat after the same is made in order to permit the closed end to be formed. For this purpose the slides 115 are used. These slides are operated by the cam-plate 117, located on oscillating shaft 119. As said shaft is rocked in the direction of the arrow the cam 117 is caused to project the slide of the former 109, which has just received the blank in the first position $a$, the shaft is rocked in the other direction, said slide is drawn in, and when it reaches the lowermost point or the fourth position $d$ the slide is again projected so as to start the complete package off the former, from which latter the stripping-roll 232 takes said package and drops it through orifice 227.

It may here be noted that the former-disk 105 has four quarter-revolutions caused by the star movement, and that each former 109 has four positions, as indicated by $a$, $b$, $c$, and $d$, Fig. 1, the first position being at $a$, the second at $b$, the third at $c$, and the fourth at $d$.

The forming and stripping slide 115 at $a$ having been projected, the seam-folding blades 127 128 are caused to move upwardly and forwardly, so as to draw the blank taut around the sides of the former by means of the cam 12, which rocks shaft 17 and elevates rod 21 and slide 22 A simultaneous inward movement is imparted to the blades 127 128 by means of the double-acting cams 137 138, which actuate the reciprocating rods 132 132$^a$ through bell-cranks 133 134. As the blades 127 128 reach the upper side of the former they cease to rise, but continue to move inwardly and draw the sides of the blank over said slide. The blade 127 is caused to move over the top of the former before the blade 128 in order to lay down the ungummed edge of the blank, so that when the blade 128 advances the gummed edge will be pressed upon said ungummed edge and the seam or joint made. The blades 127 128 are now withdrawn and the blank is carried to $b$, the second position, by means of the star movement. This is a peculiar movement and is so devised as that during the time the blank is being operated upon it permits the former-disk 105 to remain at rest. Each time cam-shaft 11 rotates it brings the pin 98$^a$ around into one of the radial ways 103 and permits the head 102 to turn a quarter-revolution by reason of said pin engaging the walls of said ways, said pin first moving into the way and then out of it in its endeavor to pass the head 102. The periphery 97$^a$ of the wheel 97 will be received by one of the semicircular cutways 104 when the pin 98$^a$ passes out of the radial way and the further turning of the head 102 thereby delayed until the pin passes into a way 103 again, which it does after each operation on the blank.

At $a$ the incomplete package will have been made into the shape shown in Fig. 19. At $b$ the upper or first end-folders come into play. Of these the flap-forming blades 160 161 first operate, and they are given an inward approaching and downward movement onto the end of former 109 by reason of the cams 140 141 and 176 177 acting, respectively, on the reciprocating bars 142 143 and the levers 174 175, which in turn actuate the parts carried by bracket-arm 148, which are attached to said blades. The notched blade 160 is given a movement in advance of the other blade in order to permit one part of the blank to be folded over the other. These movements of blades 160 161 cause them to tuck in the sides, so as to form the two end flaps, of which the one gummed is at the proper time pressed down and sealed by means of the forwardly and downwardly moving flap-folder blade 186, and which, with said blades 160 161, gives to the complete package the shape shown in Fig. 20. The blades 160 161 186, having now done their work, are withdrawn and the former passes to $c$, the third position. At this point the pin 215 is caused by spring 200 to engage the under side of and press up the arm 212, so as to throw the blade 214 against the bottom of the package and under the unfolded flap shown in Fig. 20. In its upward movement the blade 214 presses against the parts of the end already folded down and, if they are not properly sealed, gives them an additional pressure. Said blade 214 also forms a breaker and a support for the unfolded flap, and thus assists in forming a crease in connection with the blade 207, which is caused to lower and advance by reason of the cam 199 acting on lever 196 and moving it in the direction of the arrow, Fig. 16. As the folder-blade 207 advances to its work it folds down and seals the last flap and the package is completed, as shown in Fig. 21. I will here explain that the end flap last to be folded contains the short strip of gum applied midway the length of the outer edge of the blank by means of the projection 42$^b$, and this gum being still adhesive causes the flap, when pressure is applied to it, to be firmly adhered or sealed to the outer face of the previously-folded other end flap. Before the blade 207 has completed its forward movement the blade 214 will have been drawn out of the way by reason of the pin 215 engaging the heel 213 of the arm of the blade. The blades 207 214 having been withdrawn, the complete package is now carried to $d$, the fourth position. Then the slide 115 is projected in the manner and by the means previously stated, bringing the package against the stripping-roll 232, which strips it from its former and drops it through the orifice 227 ready for use.

I would call attention to the fact that the seam-folding, primary end-folding, and secondary or finishing end-folding mechanisms to which the radially-arranged formers are successively presented by the rotation of the head are located in the plane thereof, this arrangement providing for ready access to the mechanisms for attention and repair and giving them the maximum of clearance from each other.

When the first package is being made, other packages will be in process of manufacture on the other formers, and they will be undergoing the successive stages of making that said package has.

I do not limit myself to the particular construction of the machine, as it is evident that it is susceptible of various changes of construction within the province of skilled mechanics, which may be resorted to without departing from the scope and spirit thereof. I am aware, however, that is old in paper-bag machines to employ an intermittently-rotated wheel provided with formers which successively present blanks for folding mechanisms, and I do not claim such a construction broadly.

Having fully described my invention, what I claim as new, and desire to secure by Letters Patent, is—

1. In a machine for making paper packages or wrappers, the combination with a hopper to receive the paper blanks, of a blank-carrier having a vertically-reciprocating device for picking the topmost blank from the pile in the hopper, a gumming mechanism including an intermittently-operated roll over which the said device is passed for being gummed preparatory to being presented over the hopper, and mechanism for rotating the roll at a speed uniform with the movement of the carrier when the same is passing over it, whereby the gum is uniformly applied, substantially as described.

2. In a machine for making paper packages or wrappers, the combination with an intermittently-rotated disk or head provided with radially-arranged formers, of means for feeding previously-cut blanks thereto, a pair of seam-folding blades, and mechanism for moving the said blades upward and inward around the formers as the same are successively presented thereto, substantially as described.

3. In a machine for making paper packages or wrappers, the combination with an intermittently-rotated disk or head provided with radially-arranged formers, a pair of flap-forming blades, a flap-folding blade coöperating conjointly therewith, and means for imparting inward and downward movement to the said blades with respect to the formers which are successively presented to the blades by the intermittent rotation of the disk or head, substantially as described.

4. In a machine for making paper packages or wrappers, the combination with an intermittently-rotated disk or head, provided with radially-arranged formers, of feeding mechanism for feeding previously cut and gummed blanks to the said formers, a tucking and flap-creasing blade, and a top-folding and end-pressing blade coöperating conjointly therewith to fold the flap thereover, the said blades being constructed and arranged to coact with the formers as the same are successively presented to them by the rotation of the head, substantially as described.

5. In a machine for making paper packages or wrappers, the combination with a former, of a pair of flap-forming blades, a flap-folding blade coöperating therewith, means for imparting inward and downward movement with respect to the former to the said blades, a tucking and flap-creasing blade, and a top flap-folding and end-pressing blade coöperating therewith, substantially as described.

6. In a machine for making paper packages or wrappers, the combination with a former, of a slide mounted therein, mechanism for folding a blank around the former and over the end thereof, a continuously-driven stripper-roll, and means for operating the slide which partly strips the package from the former and thus brings the same into contact with the said roll, substantially as described.

7. In a machine for making paper packages or wrappers, the combination with an intermittently-rotated disk or head, provided with radially-arranged formers, of a blank-gripper extending outward under each former, means for automatically operating the blank-grippers, feeding mechanism for presenting previously cut and gummed paper blanks to the grippers which close upon them, seam-folding mechanism which folds the blanks upward around and over the formers in one position of the head, primary end-folding mechanism which acts upon the blanks in the next position of the head, and secondary or finishing end-folding mechanism which acts upon the blanks in the next position of the head, the said seam-folding, primary end-folding and secondary or finishing end-folding mechanisms being organized independently of each other and located in the plane of the said disk or head, substantially as described.

8. In a machine for making paper packages or wrappers, the combination with a former, of a slide mounted therein and having forming and stripping functions, a cam for actuating the said slide first for the performance of its forming function, and then for the performance of its stripping function, the slide being retracted even with the end of the former to permit the blank to be folded over the same between its ejections for the performance of its said forming and stripping functions, substantially as described.

9. In a machine for making paper packages or wrappers, the combination with a rotary head provided with radially-arranged formers, of a feeding mechanism for supplying previously cut and gummed blanks to the formers, independently-organized seam-folding, primary end-folding, secondary or finishing end-folding mechanisms to which the said formers are successively presented by the rotation of the head, slides mounted in the formers for coacting with the seam-folding mechanism, means for stripping the completed packages from the formers, and means for operating the said slides to eject them for coöperation with the seam-folding mechanism and for coöperation with the means for stripping the packages from the formers, substantially as described.

10. In a machine for making paper packages and wrappers, the combination with a former, of a slide mounted therein, and having forming and stripping functions, means for actuating the slide, which is retracted even with the end of the former between its ejection for the performance of its forming function, and its ejection for the performance of its stripping function, and devices coöperating with the slide when ejected, for stripping a package completely from the former, substantially as described.

11. The combination with a former, of a slide mounted therein and having forming and stripping functions, means for operating the slide which is retracted even with the end of the former between the performance of its forming and stripping functions, and a continuously-rotated roll arranged to coact with the slide, when the same is ejected, for stripping a package completely from the former, substantially as described.

12. In a machine for making paper packages or wrappers, the combination with an intermittently-rotated disk or head provided with radially-arranged formers, gumming and feeding mechanisms for automatically feeding previously cut and gummed blanks to the formers, blank-grippers for coacting with the formers, a seam-folding mechanism for coacting with the formers in one position of the head, primary end-folding mechanism for coacting with the formers in the next position of the head, secondary end-folding or finishing mechanism for coacting with the formers in the next position of the head, means for stripping the packages entirely from the formers in the next position of the head, longitudinally-movable slides mounted in each of the formers, and having forming and stripping functions, and means for operating said slides, substantially as described.

In testimony whereof I have signed this specification in the presence of two subscribing witnesses.

FRANK J. LUDINGTON.

Witnesses:
 FRED C. EARLE,
 LILLIAN D. KELSEY.